United States Patent [19]

Yagi et al.

[11] Patent Number: 4,709,194

[45] Date of Patent: Nov. 24, 1987

[54] METHOD OF CONTROLLING THE MODE OF DRIVING ELECTRIC VEHICLES

[75] Inventors: Shigeichi Yagi; Junichi Shigeura, both of Hyogo, Japan

[73] Assignee: Mitsubishi Denki Kabushiki Kaisha, Tokyo, Japan

[21] Appl. No.: 886,605

[22] Filed: Jul. 18, 1986

[30] Foreign Application Priority Data

Sep. 20, 1985 [JP] Japan ................................. 60-209425

[51] Int. Cl.$^4$ ............................................. B61C 15/12
[52] U.S. Cl. ..................................... 318/52; 180/197; 303/109; 340/52 R; 361/238; 364/426
[58] Field of Search .................... 318/52, 53, 59, 61; 180/197; 246/182 C, 182 R; 303/93, 94, 95, 97, 99, 103, 109, 112, 20, 22 R; 340/52 R; 361/238; 364/426; 105/61

[56] References Cited

U.S. PATENT DOCUMENTS

| | | | |
|---|---|---|---|
| 4,321,677 | 3/1982 | Takahashi et al. | 303/109 X |
| 4,392,091 | 7/1983 | Roberts et al. | 318/52 |
| 4,404,633 | 9/1983 | Goicoechea | 303/93 X |
| 4,463,289 | 7/1984 | Young | 318/52 |
| 4,588,932 | 5/1986 | Riondel | 318/52 |

FOREIGN PATENT DOCUMENTS

| | | | |
|---|---|---|---|
| 54-31108 | 3/1979 | Japan | 105/61 |
| 60-245405 | 12/1985 | Japan | 105/61 |

OTHER PUBLICATIONS

"Faiveley Anti-Skid AEF 83", Jan. 1985.

Primary Examiner—William M. Shoop, Jr.
Assistant Examiner—Bentsu Ro
Attorney, Agent, or Firm—Bernard, Rothwell & Brown

[57] ABSTRACT

A method of controlling the mode of driving an electric vehicle so that the electric vehicle is accelerated at a maximum acceleration and is decelerated at a maximum deceleration. The mode of variation of the running speed of the electric vehicle is estimated on the basis of the variation of the running speed of the electric vehicle calculated from the revolving speeds of the axles of the electric vehicle detected by revolving speed detectors associated with the axles, respectively. The axles are controlled for minute idle rotation or minute slip on the basis of the estimated mode of variation of the running speed of the electric vehicle to produce a maximum effective adhesion between the wheels attached to the axles and the rail so that the acceleration of the electric vehicle at a maximum acceleration and the deceleration of the same at a maximum deceleration are achieved. The torque of the axle carrying the greatest axle load among the driving axles of the electric vehicle is reduced intermittently or continuously so that the wheel attached to this axle is brought into steady rolling contact with the rail to calculate the estimated mode of variation of the running speed on the basis of a time interval between two successive torque reducing operations by means of a microprocessor or the like. Thus, the mode of driving an electric vehicle can be accurately controlled to produce a maximum effective adhesion through calculation based on the revolving speed of the axle.

4 Claims, 10 Drawing Figures

FIG. 5
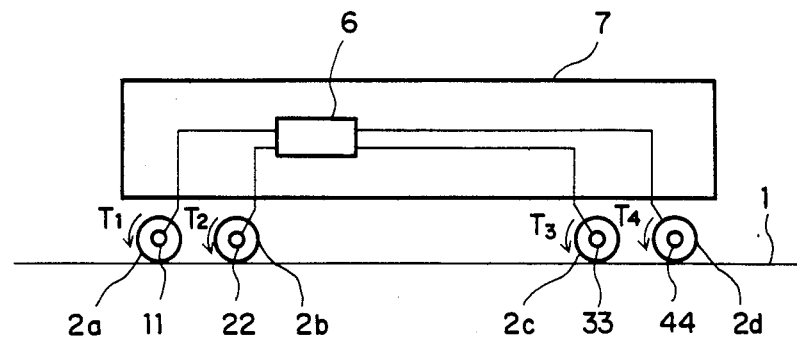
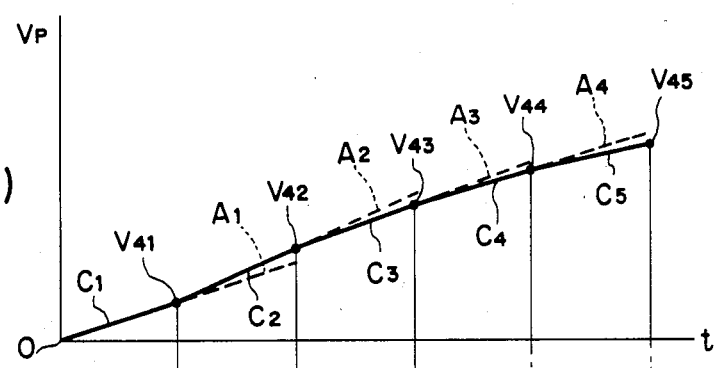
FIG. 6 (A)
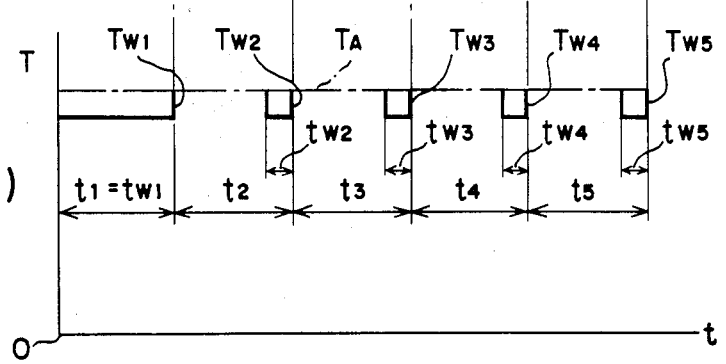
FIG. 6 (B)

METHOD OF CONTROLLING THE MODE OF DRIVING ELECTRIC VEHICLES

BACKGROUND OF THE INVENTION

1. Field of the Invention

The present invention relates to a method of controlling the mode of driving electric vehicles that run along a track, as electric locomotives and electric railroad cars, so as to accelerate the electric vehicle at a maximum acceleration and to decelerate the same at a maximum deceleration by enhancing the adhesion acting between the wheels of the electric vehicle and the rail.

2. Description of the Prior Art

As is generally known, a railroad vehicle, as an electric railroad vehicle, runs as the wheels thereof are rolled along rails 1 as illustrated in FIG. 1. The mode of rolling of the wheel is dependent on the correlation between the ratio of an adhesion F that is applied to the wheel 2 by the upper surface of the rail 1 to a weight W applied to the upper surface of the rail 1 by the wheel 2, namely, coefficient of adhesion $\mu = F/W$, and the ratio of the difference of the circumferential speed $V_s$ of the wheel from the speed $V_p$ of the center P of the wheel 2 relative to the rail 1 to the speed $V_p$ of the center P of the wheel 2 relative to the rail 1, namely, slip factor $\tau = (V_s - V_p)/V_p$. The relation between the coefficient of adhesion $\mu$ and the slip factor $\tau$ is represented by a curve a in FIG. 2, in which the coefficient of adhesion $\mu$ and the slip factor $\tau$ are measured on the axis of ordinate and on the axis of abscissa, respectively.

A conventional controller for controlling the mode of driving an electric vehicle controls the mode of driving an electric vehicle on the basis of such a relation between the coefficient of adhesion $\mu$ and the slip factor $\tau$. As illustrated in FIG. 3, the conventional controller comprises wheels 2a, 2b, 2c and 2d supported on four axles, respectively, so as to roll along a rail 1, revolving speed detectors 11, 22, 33, 44 for detecting the respective revolving speeds $V_{s1}$, $V_{s2}$, $V_{s3}$ and $V_{s4}$ of the wheels 2a, 2b, 2c and 2d, a relative speed detector 5, as a Doppler radar, for detecting the speed $V_p$ of a vehicle body 7 relative to the rail 1, and a propulsion/braking controller 6 which calculates the slip factor $\tau$ on the basis of the speed $V_p$ given thereto from the relative speed detector 5 and the revolving speeds $V_{s1}$, $V_{s2}$, $V_{s3}$ and $V_{s4}$ given thereto from the revolving speed detectors 11, 22, 33 and 44 and controls the revolving speed $V_{s1}$, $V_{s2}$, $V_{s3}$ and $V_{s4}$ of the wheels on the basis of the calculated result. A detector of the radar system using the Doppler effect of radio waves or light is employed as the relative speed detector 5. In order to meet a required measuring accuracy, the radar uses radio waves of a frequency in the tens GHz band or light. The controller 6 calculates $\tau = (V_s - V_p)/V_p$ by using the speed $V_p$ given thereto from the relative speed detector 5, and the revolving speeds $V_{s1}$, $V_{s2}$, $V_{s3}$ and $V_{s4}$ of the wheels 2a, 2b, 2c and 2d given thereto from the revolving speed detectors 11, 22, 33 and 44, and then the controller 6 controls the revolving speeds $V_{s1}$, $V_{s2}$, $V_{s3}$ and $V_{s4}$ of the wheels 2a, 2b, 2c and 2d with reference to the curve a of FIG. 2 so that a maximum coefficient of friction $\mu$max is obtained.

The conventional method of controlling the mode of driving electric vehicles has the following problems. Since a detector of the radar system using a radio wave or light is employed for detecting the speed of the vehicle body 7 relative to the rail 1 and the frequency band of the radio wave or light applicable to the detection is limited to a very narrow range, the detector for measuring the speed $V_p$ is very expensive and only limited special manufacturers are capable of the manufacture and maintenance of such a detector. When a radio wave is used, the operation of the detector is disturbed by induction troubles attributable to the neighboring communication systems. On the other hand, when light is used, the detector is bothered by the soiling of the components of the optical system such as a lens and the wear of the lamp. Furthermore, since the detector of either the radio system or the optical system uses the reflected wave (reflected light) for measurement, the measuring accuracy is deteriorated when the surface of the rail 1 is very flat, when there are snowdrifts or water puddles are in the track or when there are spaces between the crossties as in sections of the track on bridges, and, in the worst case, the measurement of the running speed of the electric vehicle is impossible.

A method of controlling the minute idle rotation of the wheels by detecting the slip of wheels from the data of the individual axles is proposed in a paragraph "Principles of Operation" of "Faively Anti-skid AEF 83 Braking Under Control", which describes that "The reference speed calculated by the Faively anti-skid device is very close to actual vehicle speed. This reference speed is the result of averaging the reconstituted speed of four axles by very elaborate means." However, this method is incapable of highly accurate control of the mode of driving the vehicle, because the control operation of this method is based on the average value of the variation of the revolving speeds of the four axles.

SUMMARY OF THE INVENTION

Accordingly, it is the principal object of the present invention to achieve the accurate control of the mode of driving an electric vehicle by accurately determining the running speed of the electric vehicle to produce a maximum adhesion on the wheels through direct calculation based on the detected revolving speeds of the wheels of one or a plurality of axles.

It is another object of the present invention to achieve the control of the mode of driving an electric vehicle without causing induction troubles in the neighboring communication systems and without using radio waves or light by controlling the mode of driving an electric vehicle on the basis of the variation of the running speed of the electric vehicle directly calculated from the revolving speeds of the axles.

It is a further object of the present invention to achieve the control of the mode of driving an electric vehicle without using radio waves or light and without the possibility of malfunction even under abnormal track conditions such as snowdrifts, water puddles or open spaces between the crossties.

It is still a further object of the present invention to simplify the constitution and to reduce the cost of a control equipment for controlling the mode of driving an electric vehicle by determining the running speed of the electric vehicle by arithmetic means, as a computer, without employing a running speed detector, as a Doppler radar.

The objects of the invention are achieved by a method of controlling the mode of driving an electric vehicle, which comprises: intermittently or continuously reducing the torque of one or a plurality of the axles of an electric vehicle to bring the wheels into rolling contact with the surface of the rail; estimating the variation of the running speed of the electric vehicle in a time interval between a time when a preceding command to bring the wheels into rolling contact with the surface of the rail is given and a time when the next command to bring the wheels into rolling contact with the surface of the rail is given, on the basis of the ratio of the variation of the running speed of the electric vehicle in a time interval between successive commands to the time interval; and controlling the driving axles of the electric vehicle on the basis of the estimated variation of the running speed for the minute idle rotation or minute slip of the wheels so that the adhesion between the wheels and the rail is enhanced to a maximum.

Since the axle load of the axle nearest the coupler is the greatest among the axles of a locomotive vehicle coupled with a hauled vehicle and hence the friction of the wheel on that axle is increased accordingly and this wheel is less liable to slip than other wheels. Therefore, according to the present invention, the running speed of the vehicle is determined by measuring the revolving speed of the wheel on the axle nearest the coupler by a revolving speed detector for the accurate control of the mode of driving an electric vehicle.

BRIEF DESCRIPTION OF THE DRAWINGS

FIG. 5 is a schematic side elevation of an electric vehicle to be controlled by the embodiment of the present invention;

FIGS. 6A and 6B are graphs of assistance in explaining the embodiment of the present invention.

DETAILED DESCRIPTION OF THE PREFERRED EMBODIMENTS

A preferred embodiment of the present invention will be described with reference to the accompanying drawings.

Figure 1:
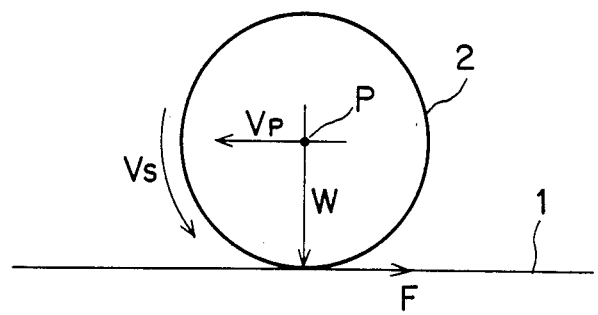
FIG. 1 is a diagrammatic illustration of assistance in explaining friction that works on one of the wheels of an electric vehicle.
Figure 2:
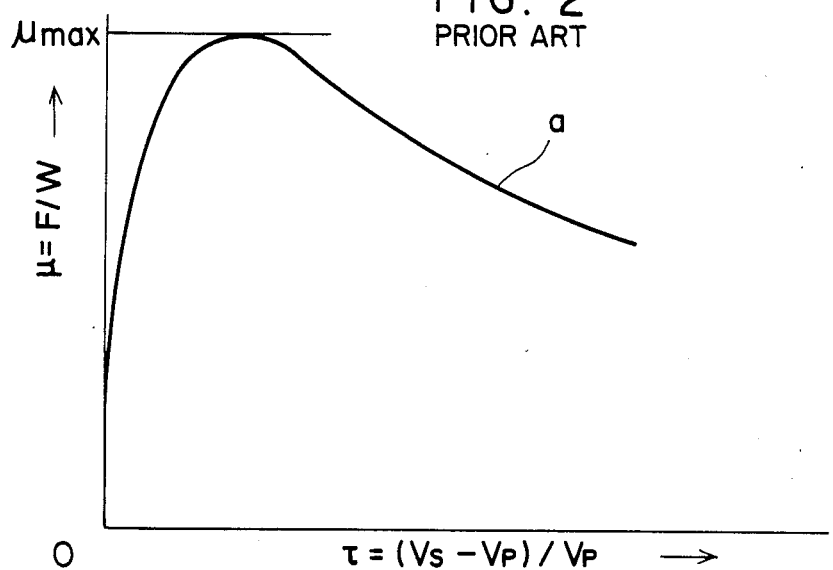
FIG. 2 is a graph showing the relation between slip factor $\tau$ and coefficient of friction $\mu$ of the wheel of FIG. 1.
Figure 3:
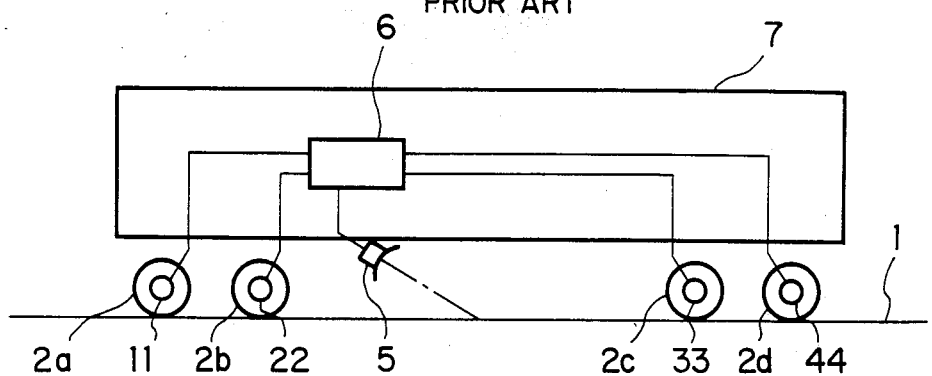
FIG. 3 is a diagrammatic illustration of a control system for carrying out a conventional method of controlling the mode of driving an electric vehicle.
Figure 4:
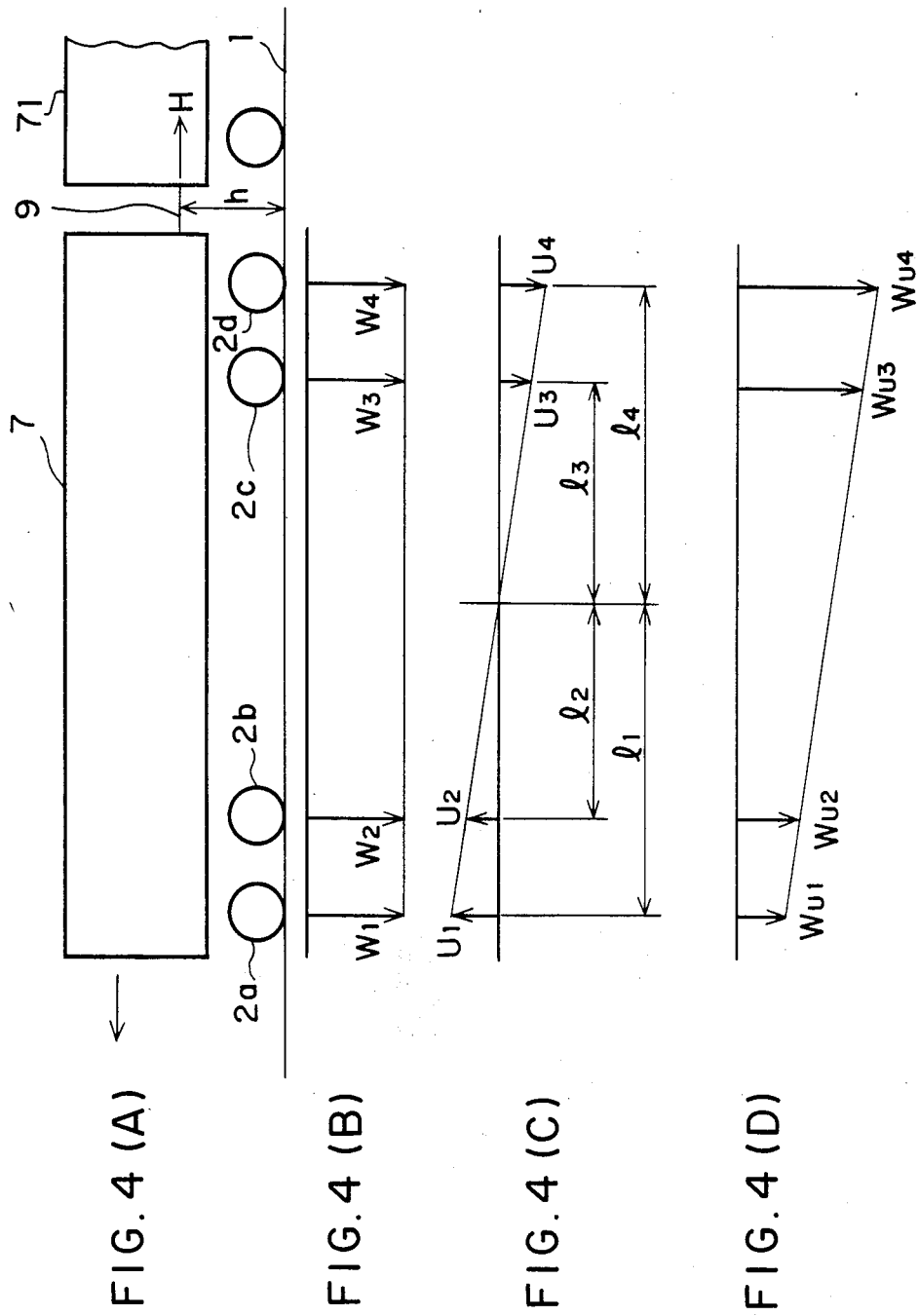
FIGS. 4A, 4B, 4C and 4D are diagrammatic illustrations of assistance in explaining the principle of a method of controlling the mode of controlling an electric vehicle, in a preferred embodiment, according to the present invention.

Referring to FIG. 4A, suppose that a locomotive vehicle 7 hauling a hauled vehicle 71 is moving forward in the direction indicated by an arrow. While the locomotive vehicle 7 is at a standstill, the same axle loads $W_1$, $W_2$, $W_3$ and $W_4$ act vertically downward at points of contact of the surface of a rail 1 and driving wheels 2a, 2b, 2c and 2d, respectively, as illustrated in FIG. 4B.

While the locomotive vehicle 7 moves in the direction indicated by an arrow hauling the hauled vehicle 71, the moment of a force $H \times h$, namely, the product of a force of traction H produced at a coupler 9 and the distance h between the surface of the rail 1 and the coupler 9. Consequently, the axle loads on the wheels 2a, 2b, 2c and 2d are changed by $U_1$, $U_2$, $U_3$ and $U_4$, respectively, by the moment of a force as illustrated in FIG. 4C, and the sum of the products of the axle load variations $U_1$, $U_2$, $U_3$ and $U_4$ and the corresponding distances $l_1$, $l_2$, $l_3$ and $l_4$ (FIG. 4C) balance the moment of a force $H \times h$, which is expressed by an expression:

$$H \times h = U_1 \times l_1 + U_2 \times l_2 + U_3 \times l_3 + U_4 \times l_4 \tag{1}$$

Consequently, the axle loads $W_1$, $W_2$, $W_3$ and $W_4$ on the wheels when the locomotive vehicle 7 is at a standstill, namely, when $H = 0$, are changed into $W_{u1}$, $W_{u2}$, $W_{u3}$ and $W_{u4}$, respectively, during hauling as illustrated in FIG. 4D. Therefore, $$W_{u1} = W_1 + U_1 \tag{2}$$

$$W_{u2} = W_2 + U_2 \tag{3}$$

$$W_{u3} = W_3 + U_3 \tag{4}$$

$$W_{u4} = W_4 + U_4 \tag{5}$$

As is apparent from the foregoing description, generally, the wheel nearest the coupler 9 coupling the locomotive vehicle 7 and the hauled vehicle 71 (the wheel 2d, in this embodiment) is least liable to slip as compared with the rest of the wheels (wheels 2a, 2b and 2c, in this embodiment), because the friction acting on the wheel 2d increases in proportion to the increment of the axle load. The present invention detects the running speed of the locomotive vehicle 7 relative to the rail 1 through the detection of the revolving speed of this most steady wheel, instead of detecting the running speed by a radio or optical speed detector, to control the wheels for minute slip or minute idle rotation.

A method of controlling the mode of driving an electric vehicle based on the foregoing principle will be described hereinafter.

Referring to FIG. 5, the running speed of the locomotive vehicle 7 is detected only by revolving speed detectors 11, 22, 33 and 44 associated with the driving wheels 2a, 2b, 2c and 2d, respectively. In FIGS. 5 and 6B, $T_1$, $T_2$, $T_3$ and $T_4$ represent the torque of the wheels 2a, 2b, 2c and 2d, respectively. If the coefficient of adhesion $\mu$ between the rail 1 and the wheels 2a, 2b, 2c and 2d is always constant, the wheel 2d rolling under the greatest axle load during hauling is the least liable to slip. Practically, the surface condition of the rail 1 changes at junctions and joints of the rails and is affected by foreign matters adhering to the surface of the rail and the condition of the railroad bed. Accordingly, in order to secure the accurate detection of the running speed $V_p$ of the locomotive vehicle 7 relative to the rail 1, the torque $T_4$ of the wheel 2d is reduced slightly so that the wheel 2d is substantially always in steady contact with the surface of the rail 1 for the accurate detection of the revolving speed of the wheel 2d. The revolving speed of the wheel 2d is used as a reference revolving speed for controlling the other wheels 2a, 2b and 2c for minute idle rotation or minute slip so that a maximum coefficient of adhesion $\mu$max is obtained for the other wheels 2a, 2b and 2c. However, if the torque $T_4$ of the wheel 2d is kept at a reduced level, the force of traction H is always reduced accordingly. Therefore, the torque of the wheel 2d is reduced intermittently at an appropriate time interval as shown in FIGS. 6A and 6B. FIGS. 6A and 6B are graphs showing the variation of the running speed $V_p$ (axis of ordinate) with time t (axis of abscissa), and the variation of torque T (axis of ordinate) with time t (axis of abscissa), respectively. In FIGS. 6A and 6B, $T_{w1}$, $T_{w2}$, $T_{w3}$, $T_{w4}$ and $T_{w5}$ are torque decrements in time intervals $t_1$, $t_2$, $t_3$, $t_4$ and $t_5$, and $t_{w1}$, $t_{w2}$, $t_{w3}$, $t_{w4}$ and $t_{w5}$ are durations of torque reduction, respectively.

When the locomotive vehicle 7 is started, the torque $T_4$ of the wheel $2d$ is reduced, for example, to 90% of an average torque $T_A$, for a time $t_1$, and the average acceleration $\alpha_1 = V_{41}/t_1$ is calculated by a microprocessor incorporated into a controller 6 (FIG. 5) and is stored in a memory. Then, the torque of the wheel $2d$ is increased for minute idle rotation. Suppose that a running speed $V_{41}$ of the locomotive vehicle 7 relative to the rail 1 is reached after a time $t_1$. Subsequently, the respective revolving speeds of the wheels $2a$, $2b$, $2c$ and $2d$ are controlled for minute idle rotation on the basis of a running speed $V_{41} + \alpha_1 \cdot t$ (t = time) calculated by the microprocessor so that a maximum adhesion will work on the wheels $2a$, $2b$, $2c$ and $2d$, on an assumption that the running speed $V_p$ of the locomotive vehicle 7 relative to the rail 1 increases with time at the acceleration $\alpha_1$. Immediately before a time $t_2$ passes after the first reduction of the torque of the wheel $2d$, namely, after a time $t_2 - T_{w2}$ has passed since the first reduction of the torque of the wheel $2d$, the torque $T_4$ of the wheel $2d$ is reduced again so that only the wheel $2d$ is brought into substantially perfect rolling contact with the rail 1, and the running speed $V_{42}$ of the locomotive vehicle 7 is stored in the microprocessor. Then, the microprocessor calculates the average acceleration $\alpha_2 = (V_{42} - V_{41})/t_2$. Subsequently, the respective revolving speeds of the wheels $2a$, $2b$, $2c$ and $2d$ are controlled for minute idle rotation on the basis of the running speed $V_{42} + \alpha_2 \cdot t$ calculated by the microprocessor so that a maximum adhesion will work on the wheels $2a$, $2b$, $2c$ and $2d$, on an assumption that the running speed $V_p$ of the locomotive vehicle 7 relative to the rail 1 increases with time at the acceleration $\alpha_2$. During this control, the torque $T_4$ of the wheel $2d$ is reduced for a time $t_{w2}$. Thus, the reference running speed is corrected subsequently after a time $t_3$, a time $t_4$ and a time $t_5$ have passed since the preceding reference running speed correction, for the minute idle rotation or minute slip of the wheels so that a maximum adhesion F will work on the wheels.

In FIG. 6A, a curve $C_1$-$C_2$-$C_3$-$C_4$-$C_5$ shows the variation of measured running speed of the locomotive vehicle when the torque of the wheel $2d$ was controlled for short periods $t_{w1}$, $t_{w2}$, $t_{w3}$, $t_{w4}$ and $t_{w5}$ at time intervals $t_1$, $t_2$, $t_3$, $t_4$ and $t_5$, curves $A_1$, $A_2$, $A_3$ and $A_4$ show estimated variation of the running speed of the locomotive vehicle before the subsequent of the correction of the reference running speed, and $V_{43}$, $V_{44}$ and $V_{45}$ are the running speeds, respectively, of the locomotive vehicle 7 relative to the rail 1 after the passage of a time $t_3$, a time $t_4$ and a time $t_5$ since the preceding correction of the reference running speed.

Although the present invention has been described in a preferred embodiment in which the axles of the four-axle electric locomotive vehicle are controlled individually, it is also possible to control a group of the wheels $2a$ and $2b$ and a group of the wheels $2c$ and $2d$ individually in a manner similar to the foregoing manner for minute idle rotation or minute slip regarding each group as a single axle. Furthermore, the same method of controlling the mode of driving electric vehicles is applicable to six-axle and eight-axle electric locomotive vehicles.

Strictly speaking, the wheels are different from each other in abrasion and hence in diameter. Therefore, the ratios of the diameters of the wheels are stored in the microprocessor when the minute idle rotation of the wheels does not occur during inertial running, and the ratios are used for correcting errors in the control operation.

It is necessary that the torque reduction $T_w$, the time interval t and the duration $t_w$ of torque reduction are decided beforehand according to the conditions of the track and the running condition, or the same can be optionally changed.

Although the torque of the wheel is reduced intermittently in the above-mentioned embodiment, the same effect is obtained by the continuous reduction of the torque of the wheel.

Thus, the present invention is capable of controlling the mode of driving electric vehicles only on the basis of the revolving speeds of the wheels measured by the revolving speed detectors associated with the wheels, without requiring any special radio or optical speed detector, which is advantageous in respect of economy and maintenance.

Furthermore, since the detecting accuracy of the revolving speed detectors is not affected by the condition of the surface of the rail, the present invention has a wide range of application.

Still further, since the present invention does not use radio waves, the present invention does not cause troubles in the neighboring communication systems.

As is apparent from what has been described hereinbefore, the present invention controls the mode of driving electric vehicles only on the basis of data measured by revolving speed detectors for detecting the revolving speeds of the wheels so that a maximum friction will work on the wheels. Therefore the electric vehicle can be efficiently started and any special radio or optical speed detector is unnecessary.

What is claimed is:

1. A method of controlling the mode of driving an electric vehicle to accelerate the electric vehicle at a maximum acceleration and to decelerate the same at a maximum deceleration by controlling the mode of driving the electric vehicle so that a maximum adhesion is produced between wheels attached to a plurality of the axles of the electric vehicle; which comprises:
   successively reducing the torque of the axle carrying the greatest axle load among a plurality of the axles so that the wheel attached to said axle carrying the greatest axle load is brought into steady rolling contact with the rail in order to detect the variation of the running speed of the electric vehicle relative to the rail;
   estimating the variation of the running speed of the electric vehicle as a function of time for the subsequent time interval between two successive torque reducing operations on the basis of the ratio of variation of the running speed in the preceding time interval between two successive torque reducing operations to said preceding time interval;
   minutely controlling the revolving speed of said axle carrying the greatest axle load on the basis of the estimated variation of the running speed with time so that a maximum adhesion meeting the running condition of the electric vehicle is produced between the wheels and the rail.

2. A method of controlling the mode of driving an electric vehicle as recited in claim 1, wherein said electric vehicle is an electric locomotive vehicle having four axles and hauling a hauled vehicle or hauled vehicles, the revolving speed of the rearmost axle carrying the greatest axle load among the four axles is controlled to reduce the torque of the same so that the rearmost wheel attached to the rearmost axle is brought into steady rolling contact with the rail, the mode of variation of the running speed of the electric locomotive vehicle for the subsequent time interval between two successive torque reducing operations is estimated on the basis of the ratio of the variation of the running speed of the electric locomotive vehicle in the preceding time interval between two successive torque reducing operations to the preceding time interval, the rotation of the power transmission shafts for rotatively driving the four axles is controlled on the basis of the estimated mode of variation of the running speed of the electric locomotive vehicle for the subsequent time interval between two successive torque reducing operations so that a maximum effective adhesion is produced between the wheels attached to the four axles and the rail.

3. A method of controlling the mode of driving an electric vehicle as recited in claim 1, wherein the running speed of the electric vehicle relative to the rail is determined on the basis of the revolving speed of each wheel detected by revolving speed detecting means attached to each axle, a reference speed for estimating the mode of variation of the running speed is calculated on the basis of the variation of the running speed by a control unit, the reference speed is corrected sequentially to control the mode of driving the electric vehicle so that a maximum adhesion is produced between the wheels and the rail.

4. A method of controlling the mode of driving an electric vehicle as recited in claim 3, wherein the running speed of the electric vehicle is determined on the basis of data detected by said revolving speed detecting means comprising revolving speed detectors, said reference speed is calculated by processing the variation of the running speed by said control unit incorporating arithmetic means comprising a microprocessor, and the mode of driving the electric vehicle is controlled so that a maximum adhesion is produced between the wheels and the rail on the basis of the reference speed.

* * * * *